July 21, 1959   D. G. MAGILL, JR   2,895,868
METHOD OF MAKING RESIN IMPREGNATED PAPER
Filed Jan. 26, 1955
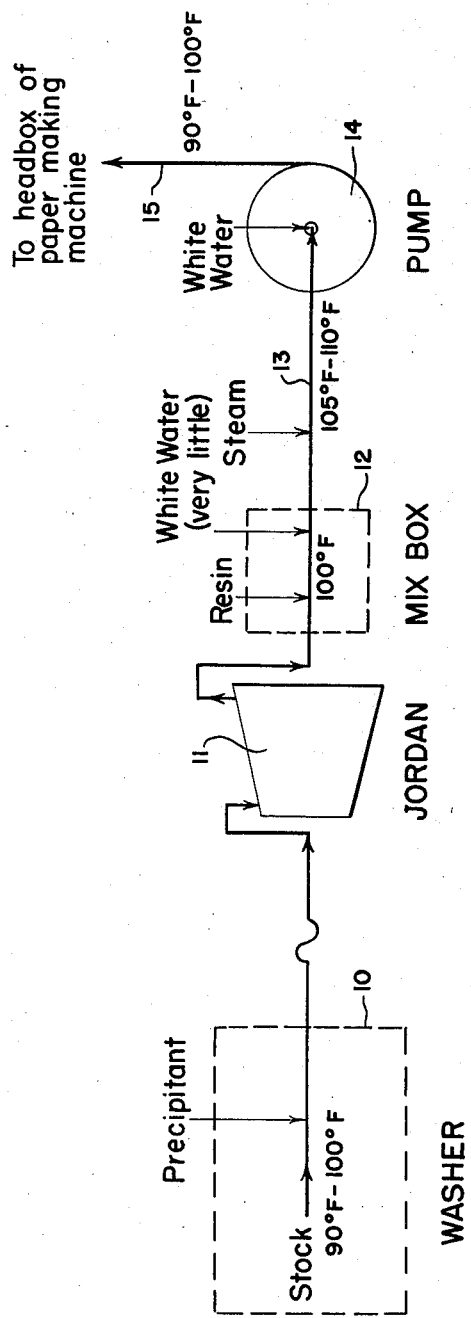
INVENTOR
Donald G. Magill Jr.
BY
ATTORNEYS

2,895,868
METHOD OF MAKING RESIN IMPREGNATED PAPER

Donald G. Magill, Jr., Milford, N.J., assignor, by mesne assignments, to Riegel Paper Corporation, New York, N.Y., a corporation of Delaware Application January 26, 1955, Serial No. 484,230

7 Claims. (Cl. 92—21)

This invention relates to the manufacture of resin impregnated papers, and more particularly to the manufacture of a low density, high porosity resin impregnated paper suitable for use as a filter paper and especially an oil filter paper.

Oil filter papers as well as other types of filter papers must not be weakened, disintegrated or deteriorated when subjected to the materials such as oil which they are to filter. Certain of them, for example the oil filter papers, must also possess certain rigidity. Such papers have for a long time been made a resin-impregnated paper, the resin coating the fibers thereof and protecting them against any adverse effect that might be had thereon by the material being filtered. Furthermore the resin lends strength to the paper by making it relatively rigid. The first oil filter papers employed for filtering the oil used in internal combustion engines were termed "part-flow filter papers" because only a portion of the oil used in the engines was filtered on each pass. Presently used oil filter papers, however, must be "full-flow" papers, that is, they must pass all of the oil used in an engine. There is normally provided a by-pass about a filter but this operates only when the oil pressure builds up as a result of plugging up of the pores of the paper with filtered sludge, etc. To be completely satisfactory, a present day oil filter paper must be sufficiently porous to allow free flow of oil therethrough at normal engine pressures and must be of long life, that is, not plug up too quickly. Furthermore, it must be resistant to chemical attack by the material being filtered. This last characteristic in resin impregnated filter papers is of course dependent upon the dispersion of the resin throughout the paper in such a manner that all of the fibers thereof are thoroughly coated. This of course must be accomplished without lowering the porosity to a point that will prevent a predetermined desired flow of fluid therethrough.

Resin impregnated filter papers have heretofore been manufactured in a variety of ways. They have, for example, been made by adding the resin to the furnish in a beater along with a precipitating agent which causes the resin to be deposited upon the fibers. Subsequently the paper is made in the usual manner. This type of paper has also been made by wet impregnation of a paper web immediately after it leaves the paper making machine and prior to drying. In this manner substantially more resin can be incorporated into the paper than by the aforementioned beater addition method. Resin impregnated filter papers have also been made by impregnating dry webs of paper with resin, though in this case the resin is not apt to be so uniformly deposited through the paper. From the point of view of economy, the beater addition method is the best method of making the type of filter paper with which this invention is particularly concerned, namely an oil filter paper. The term "beater addition method" is used herein to cover a method of making resin impregnated paper in which the resin is added to a paper machine head box as well as the aforementioned method in which the resin is added to the furnish in a beater proper.

The principal drawback of the beater addition method is that considerable resin may be wasted because it will not have been completely precipitated onto the fibers and will be carried away by the water at the paper making machine wire or cylinder. It has been discovered, however, that this resin loss can be substantially reduced if the resin-fiber-precipitating agent slurry is heated, prior to the aforementioned formation of the paper web, to a temperature above the sticking point temperature of the resin. To avoid encountering any difficulty, however, from the resin at this temperature sticking to the paper machine screen, I have found that it is necessary after the aforementioned heating of the slurry to cool it to a temperature below the sticking point temperature of the resin. This can readily be accomplished at the head box of the paper making machine by the normal addition of white water at a suitable temperature.

Broadly, this invention therefore contemplates an addition of a precipitant and a resin to a pulp slurry satisfactory for filter paper use and a heating of the mixture to a temperature above the sticking point temperature of the resin and a subsequent cooling thereof to a temperature below the sticking point temperature of the resin, both prior to the deposition of the slurry mixture upon the screen of a paper making machine. While the invention is not limited thereto, I have found that it is more convenient in certain instances, for example in the low resin addition ranges, to add the precipitant to the pulp slurry prior to the addition of the resin thereto.

More specifically, the invention contemplates the preparation of the pulp in a washer or beater. The pulp should be one of a type normally used for making filter papers and is, according to this invention, advantageously made up of cotton linters, for example, Hercules #46 cotton linters, or it may be in certain instances an unbleached sulphate from southern pine wood, or various bleached or unbleached northern or southern soft woods. The advantage gained by using cotton linters is that a highly porous paper will be obtained even though the pulp is beaten to a lower freeness than most wood pulps. The precipitant is then advantageously added to the pulp in the washer or beater and in sufficient quantity to render the pulp acid to the extent that it has a pH of from 2.5 to 4.5, and advantageously of about 3.0. After addition of the precipitant, the mixture thereof with the pulp slurry is then fed to a refiner such as a Jordan, wherein it is further refined. It is discharged from the refiner into a mix-box where a suitable amount of resin, one of the beater addition types, is added in an amount such it will comprise about 15% to 45% by weight of the final product. The temperature of the pulp in the washer and refiner is brought to, if necessary, and maintained at about the sticking point temperature of the resin or slightly below (usually 90° to 100° F.). A small amount of white water may also be added to the mix-box, the temperature therein being maintained at about the same temperature as in the washer and refiner. The pulp-precipitant-resin slurry with the small amount of white water added is then fed to a pump by which it is lifted to the head box of a paper-making machine. On its way from the mix box to the pump the precipitated pulp-resin slurry has steam injected thereinto to raise the temperature thereof to a point about 5° to 10° above the sticking point temperature of the resin. This effects a completion of the precipitation of the resin onto the fibers of the pulp. At the pump white water is added in quantity and at a temperature such that the temperature of the precipitated pulp slurry is lowered 10° or 15° to a point below the sticking point temperature of the resin. This cooling of the slurry is necessary, as heretofore indicated, in order to prevent sticking of the resin to the paper machine wire.

As is well known in laboratory procedure, when a resin dispersed in water is heated to its sticking point the resin particles will move together to form an agglomerated mass. When this heating, however, is done in the presence of fibers to which some resin has already adhered, the resin precipitated will, rather than form an agglomerated mass, flow toward that already deposited on the fibers. In this manner, I have found that I can greatly improve the resin precipitation and consequently greatly diminish the resin loss normally incurred in a beater addition method of impregnation. However, because the resin is evenly distributed throughout upon the fibers, the porosity of a finished sheet formed from the precipitated pulp-resin slurry is not greatly diminished. As a matter of fact, it is quite feasible to make filter paper from cotton linters having a resin content up to 45% by weight and a porosity of below 1 as measured by a Gurley densometer (1 second to pass 100 cubic centimeters of air through a 0.25 square inch area under the urging of a 5 ounce cylinder).

A somewhat schematic flow diagram of one way in which the method of this invention may be carried out is illustrated in the accompanying drawing. In the drawing there is illustrated in broken line a washer 10 in which the pulp slurry may be prepared. The temperature of this stock may be raised, if necessary, to 90° to 100° F. by the addition of steam. As indicated in the drawing, the precipitant is added to the stock in the washer, though as previously suggested, the precipitant might be added at some later point in the manufacture of the filter paper. From the washer 10 the pulp-precipitant mixture is fed to the inlet of a Jordan type refiner 11 wherein it is further beaten. It is discharged from the refiner 11 into a mix-box 12 where its temperature is raised slightly by the addition of a small amount of white water. The resin, which is of the beater addition type as indicated, is added in the mix box. Some of the resin will immediately adhere to the fibers of the pulp in the mix box. From the mix box, the precipitated pulp-resin slurry is fed through a conduit 13 to a pump 14 by which it is raised through another conduit 15 to the head box of a paper making machine not shown. During its travel through conduit 13 and pump 14, the precipitated pulp-resin slurry has its temperature raised about 10° to a point above the sticking point temperature of the resin. The injection of steam should be made at a sufficient distance rearwardly of the pump 14 so that all of the slurry is uniformly heated and the precipitated resin has time to be deposited on the pulp fibers. At the pump 14, white water is added in considerable quantity and at such a temperature as to lower the temperature of the slurry to a point below the sticking point of the resin. This cooling of the slurry prior to depositing it on the screen of the paper-making machine is necessary, of course, as previously indicated, to prevent any sticking of the resin or resin-coated fibers to the screen. The temperatures shown on the drawing are those which would be employed at the various points shown for use with a resin, the sticking point of which is about 100° F.

I will now describe a specific example of the manufacture of a resin impregnated oil filter paper in accordance with my invention.

A furnish of 600 pounds AD of Hercules #46 cotton linters and 100 pounds AD of cotton linter broke was added to the washer and beaten therein for about 3 hours. The temperature in the washer was raised and maintained at about 90°–100° F. One pound of Nopco KFV, which is a sulfonated tall oil anti-foaming agent, was also added. After substantial processing of the furnish in the washer, 150 pounds of precipitant was mixed therewith. The precipitant comprised 100 parts of water, 10 parts of alum (solids) and 4 parts of 66° Bé. sulphuric acid. Subsequently the pulp-precipitant slurry was fed to a Jordan type refiner from which it was thence passed into a mix box. In the mix-box 250 pounds of a beater addition resin, specifically a beater addition resin sold under the trade name Synco 742 R, sold by the Snyder Chemical Company of Bethel, Connecticut, was added. This resin comprises about 50% by weight of solid resin. A small amount of white water was also added to the mix box. The mix-box temperature was maintained at about 100° F. The precipitated pulp-resin slurry was then passed through a supply conduit to a pump by which it was subsequently raised to the head box of a paper-making machine. Prior to reaching the pump, however, it had steam injected into it in the conduit to raise its temperature to about 110° F. At the pump, however, considerable white water was added to the slurry, decreasing the temperature thereof to below 100° F. From the head box the diluted slurry was then fed to the screen of a paper-making machine and the paper made thereon.

As indicated, the Synco 742 R resin is a beater addition resin. It is a phenol formaldehyde resin emulsion and is but one of a number of this type that may be employed in the process of this invention. Such resins can be made by reacting phenol and/or its analogues with formaldehyde in the presence of an alkaline condensing agent. The mol ratios of phenol to formaldehyde should preferably be in the range of 1:1 to 1:2½. The condensation is carried to an end point of a liquid with water solubility limited to a degree suitable for paper-making practice. Such a resin, when over a certain amount of water is present, kicks out, that is, precipitates. The maintenance of the pH of the precipitated pump-resin slurry at from 2.5 to 4.5, and preferably at about 3, aids in the precipitation of the resin. The alum added to the slurry as a portion of the precipitant effects deposition of the resin particles on the pulp fibers.

The characteristics of the paper made in the above example are as follows, sample A having been taken near the beginning of the run of the paper machine and sample B about and hour and a half thereafter:

|  | Sample A | Sample B |
| --- | --- | --- |
| Basis weight in pounds per ream (24″ x 36″—500 sheets) | 71 | 72 |
| Gauge in mils | 25 | 25 |
| Apparent density—basis weight/gauge | 2.8 | 2.9 |
| Air flow in cu. ft. per min. (the cubic feet of air that will pass through 1 sq. ft. of the paper in a minute under the urging of 1/2″ of water) as measured by a Gurley permeometer in accordance with A.S.T.M. method D-737-46 | 90 | 83 |
| Dry tensile in pounds per in. of sample width (when testing): | | |
| Resin uncured— | | |
| Lengthwise of machine | 8.1 | 6.7 |
| Transverse of machine | 4.2 | 4.5 |
| Resin cured— | | |
| Lengthwise of machine | 10.0 | 8.8 |
| Transverse of machine | 5.2 | 5.4 |
| Wet tensile resin cured: | | |
| Lengthwise of machine | 5.3 | 4.9 |
| Transverse of machine | 3.1 | 2.9 |
| Stiffness measured in milligrams according to standard American Pulp and Paper Association Standards: | | |
| Dry in machine direction | 522 | 664 |
| Wet in machine direction | 190 | 170 |

I claim:

1. A method of making a resin impregnated paper which comprises preparing an aqueous slurry of pulp, adding a quantity of a beater addition resin and a precipitating agent to the aqueous slurry prior to supplying the aqueous slurry to the head box of a paper making machine, initially maintaining the resin-pulp-precipitating agent slurry at a temperature not above the sticking point temperature of the resin whereby to effect a partial precipitation of the resin onto the fibers of the aqueous slurry, raising the temperature of the aqueous resin-pulp-precipitating agent slurry prior to its reaching the head box to a temperature above the sticking point temperature of the resin whereby to effect a further precipitation of the resin onto the fibers, cooling said aqueous slurry to reduce the temperature thereof to a point below said sticking point temperature of the resin, and then making paper from said cooled slurry.

2. A method according to claim 1 in which the resin is a phenol formaldehyde resin emulsion of limited water solubility.

3. A method according to claim 1 in which the aqueous resin-pulp-precipitating agent slurry is heated by injecting steam thereinto.

4. A method according to claim 3 in which the aqueous slurry is subsequently cooled by the addition of white water thereto.

5. A method of making a low density, high porosity resin impregnated paper which comprises adding a precipitating agent to an aqueous slurry of pulp in a pulp refiner, adding a sufficient amount of a beater addition resin to the aqueous slurry as it leaves the refiner on its way to a paper machine head box to comprise in the finished paper 15% to 45% of the weight thereof, initially maintaining the resin-pulp-precipitating agent slurry at a temperature not above the sticking point temperature of the resin whereby to effect a partial precipitation of the resin onto the fibers of the aqueous slurry, raising the temperature of the aqueous resin-pulp-precipitating agent slurry prior to its reaching the head box to a temperature of from 5° to 10° F. above the sticking point temperature of the resin whereby to effect a further precipitation of the resin onto the fibers, adding white water to said slurry to reduce the temperature thereof to a point below the sticking point temperature of the resin, and then making paper from said cooled slurry.

6. A method according to claim 5 in which the temperature of the aqueous resin-pulp-precipitating agent slurry is raised by injecting steam thereinto.

7. A method of making a low density, high porosity resin impregnated filter paper which comprises preparing an aqueous slurry of cotton linters in a washer, adding a precipitating agent made up of alum and a small percentage of sulphuric acid to the aqueous slurry in said washer, passing said mixture of pulp and precipitating agent to a refiner, adding a sufficient amount of a phenol formaldehyde resin emulsion of limited water solubility to said mixture as it leaves said refiner to comprise in the finished paper 15% to 45% of the weight thereof, initially maintaining the resin-pulp-precipitating agent slurry at a temperature not above the sticking point temperature of the resin whereby to effect a partial precipitation of the resin onto the fibers of the aqueous slurry, supplying said mixture through a conduit to the head box of a paper making machine, raising the temperature of the aqueous resin-pulp-precipitating agent slurry in the conduit on its way to the head box to a temperature of about 5° to 10° F. above the sticking point temperature of the resin by injecting steam thereinto whereby to effect a further precipitation of the resin onto the fibers, then adding white water to said slurry to reduce the temperature thereof to a point below the sticking point temperature of the resin, and then making paper from said slurry.

References Cited in the file of this patent

UNITED STATES PATENTS

| | | |
|---|---|---|
| 1,825,869 | Keller | Oct. 6, 1931 |
| 1,949,249 | Fisher | Feb. 27, 1934 |

OTHER REFERENCES

Stephenson: "Pulp and Paper Manufacture," McGraw-Hill, New York, N.Y., 1951, vol. 2, page 323.